UNITED STATES PATENT OFFICE.

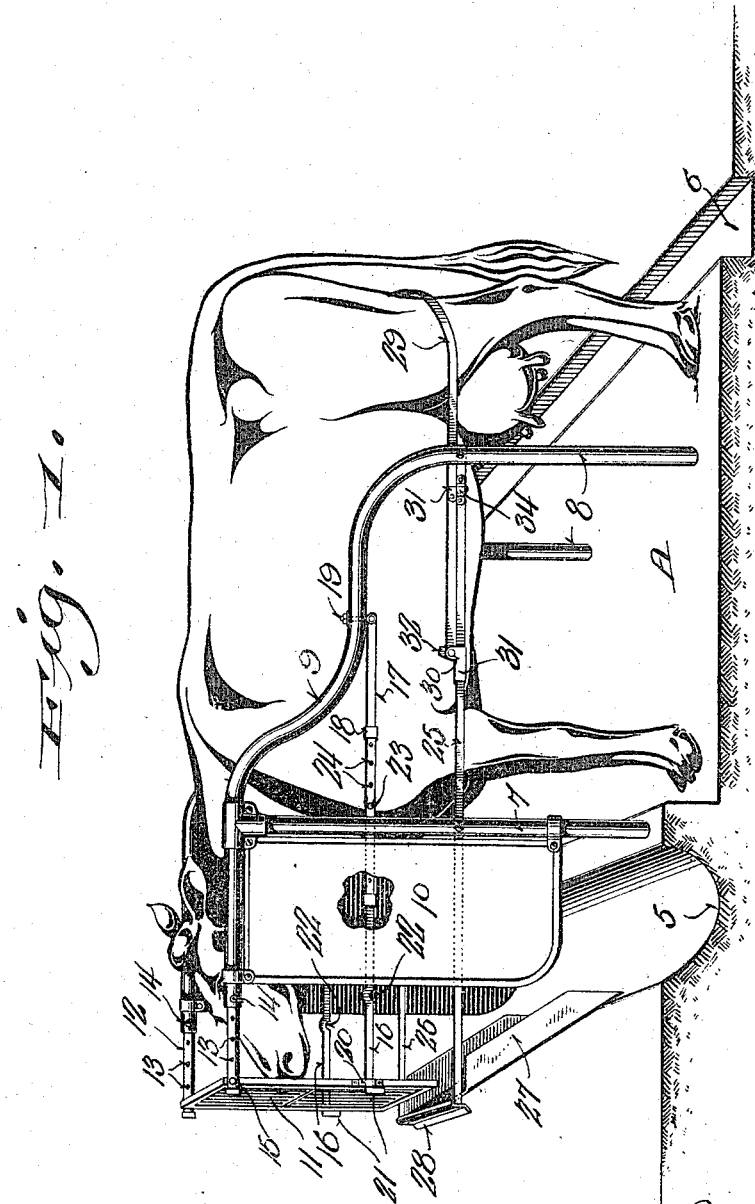

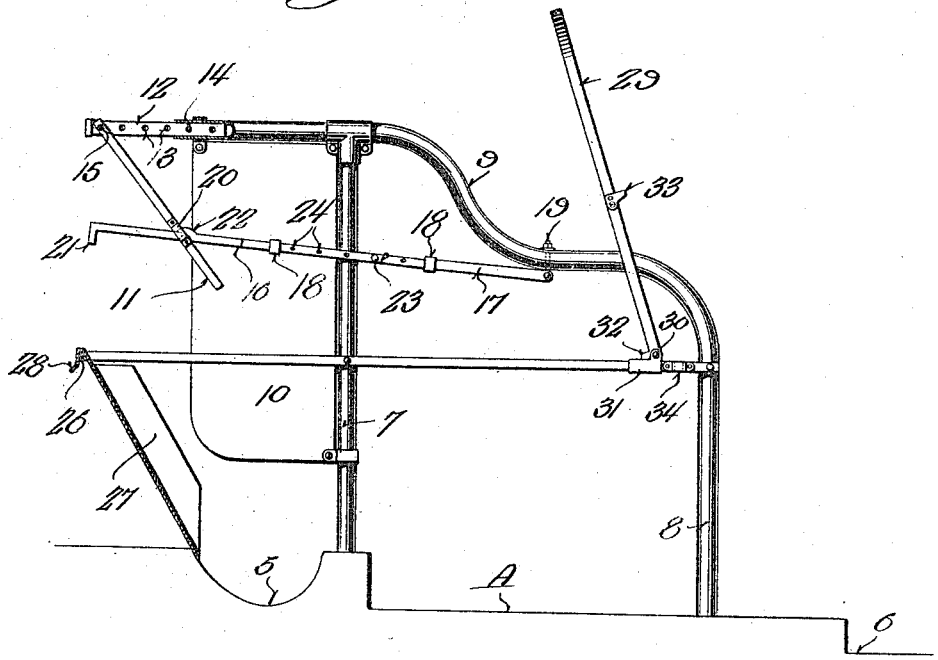

HERBERT H. DREW, OF WATERLOO, WISCONSIN.

COW-STALL.

1,209,688.  Specification of Letters Patent.  Patented Dec. 26, 1916.

Application filed May 13, 1916.  Serial No. 97,246.

*To all whom it may concern:*

Be it known that I, HERBERT H. DREW, a citizen of the United States, and resident of Waterloo, in the county of Jefferson and State of Wisconsin, have invented certain new and useful Improvements in Cow-Stalls; and I do hereby declare that the following is a full, clear, and exact description thereof.

The present invention relates to new and useful improvements in cow stalls, more particularly of that type wherein means is provided for retaining cows in the stall and for adjusting the lengths of the stalls to accommodate cows of different lengths.

It is in general the object of the present invention to simplify and otherwise improve the structure of stalls of this nature and to facilitate cleaning of the stalls.

More specifically, it is an important object of the invention to provide a means at the rear of a stall for holding a cow in proper alinement with the usual gutter, which means is movable inwardly of the stall when not in operation, to thus facilitate cleaning of the gutter and the adjacent stall portion, in contradistinction to the usual type of stall wherein the rear stall posts which carry retaining chains, are disposed at the edge of the gutter.

Particularly in connection with herds of blooded cows, it is desirable to provide a stall arrangement which is of such nature as to afford a maximum view of the cows in the stalls, whereby they may be readily inspected, and it is also an object to provide a stall wherein a maximum view of the cow is afforded.

It is further an object of the invention to provide a means for adjusting the usual grid plate at the front of the stall to thus vary the length of the stall to accommodate cows of differing lengths and it is more specifically an object to procure such adjustment in a manner permitting holding of the grid plate in various desired positions.

The present invention also contemplates the provision of an improved food chute structure for the feed trough of the stall which is readily removable to facilitate cleaning.

With the above and other objects and advantages in view, the invention resides more particularly in the novel combination arrangement and formation of parts more particularly hereinafter described and more particularly pointed out in the appended claims.

In the drawings: Figure 1 is a perspective view of a cow stall constructed in accordance with the present invention, Fig. 2 is a central vertical longitudinal sectional view therethrough, showing the rear retaining member in retracted position and showing the grid plate swung inwardly to provide for insertion of food in the trough. Fig. 3 is a horizontal sectional view through the grid plate, and showing the holding links therefor, other portions of the structure being omitted for the sake of clearness.

Referring now more particularly to the accompanying drawings, A designates the bed of a stall, at the front end of which is transversely positioned the usual feed trough 5 and at the rear end of which is transversely positioned the gutter 6. Upstanding at the sides of the stall immediately inwardly of the trough 5 are the forward stall posts 7 and upstanding from the sides of the stall and spaced considerably inwardly of the gutter are the rear standards 8 which have their upper ends directed horizontally to form the top rails 9 of the stall body, the forward portions of these rails being upwardly offset and secured to the forward posts 7 and projected therepast. Side shield plates 10 are disposed forwardly of the posts 7 and are secured thereto and to the forward ends of the rails.

The posts and top rail are preferably formed of pipe sections and to provide for securing a grid plate 11 adjustably at the forward end of the stall, pipe sections 12 are telescopically engageable in the forward ends of the rail pipes and are provided with series of apertures 13 adapted to selectively receive bolts 14 passed through the rails. Pivot bolts 15 connect the upper corner of the grid plate with the forward ends of the pipe sections 12 and thus the plate is pivotally suspended whereby it may be swung inwardly to facilitate insertion of food in the trough 5, it being noted that the plate is positioned outwardly of the trough.

To provide a means for holding the grid plate against outward swinging movement and for retaining it in a desired inwardly swung position, which means is adjustable to compensate for adjustment of the position of the plate, holding bars are provided which comprise forward and rear sections 16 and 17 respectively, slidably connected by sleeves 18 at their adjacent ends. The other ends of the inner sections 17 are secured to pivot bolts 19 carried by the rear portions of the top rails 9 and the other ends of the forward sections are slidably passed through loops 20 formed at the lower portions of the sides of the grid plate, and having their extremities laterally directed to form stops 21 limiting the outer swinging movement of the grid plate. The intermediate portions of the forward sections are upwardly bowed to provide notches 22 adapted to receive the edges of the loops when the grid plate is swung inwardly to hold the plate in such inwardly swung position. The sections of each holding bar are held against relative sliding movement by a bolt 23 selectively passed through one of a series of openings 24 in the lapped ends of this section, the relative spacing of these openings 24 corresponding to the relative spacing of the series of openings 13 whereby upon adjustment of the grid plate, a corresponding adjustment of the holding means therefor may be procured.

Extending horizontally at the sides of the stall and secured to the intermediate portions of the posts are bars 25 which project forwardly of the trough 5 and are connected at their forward ends by a transverse bar portion 26. To facilitate the insertion of food in the trough, a chute member 27 is provided having at its upper end an outwardly and downwardly turned lip 28 adapted to seat on the transverse bar portion 26 whereby the chute is normally retained in position and may if desired be readily moved by simply lifting it from the bar to facilitate cleaning of the trough.

The bars 25 at their rear portions provide guides or tracks for mounting a movable rear retaining member, and this member comprises a U-shaped bar 29 having its arms spaced apart a distance substantially equal to the width of the stall, and pivotally secured at their free ends to upturned ears 30 carried by sleeves 31 slidable on the bars 25. The retaining member is thus pivotally and slidably mounted, and in moving it to operatively hold a cow it is swung from a substantially vertical position, and then slid inwardly to a position wherein its bight portion is positioned adjacent the inner edge of the gutter 6 to thus hold the cow in proper alinement with the gutter. In the normal retraced position of the rear end retaining member, the sleeves 31 are disposed at the rear ends of the bars 25 and the retaining member extends upwardly from the sleeves at a slight inward inclination, as more particularly shown in Fig. 2, being retained in this position by lateral ears 32 at the free ends of its legs engageable with respective sleeves. The retaining member is held against sliding movement in operative position by depending lugs 33 secured to the intermediate portions of its legs and engageable in sockets 34 at the rear ends of the bars 25.

When the retaining member is in retracted position, it is thus disposed inwardly of the rear end of the stall and inasmuch as no posts or other obstructions are disposed at the rear end of the stall, a convenient cleaning of the gutter is facilitated. Also, when the retaining member is swung upwardly to retracted position, the legs form side stall portions which assist in properly guiding a cow into the stall, and when the retaining member is swung downwardly to operative position, a clear view may be had of the rear portion of the cow, particularly inasmuch as with the present structure the rear portion of the top rail 9 may, as shown, be relatively low.

What is claimed, is:

1. In a cow stall the combination with a stall body of longitudinal guide bars at the sides thereof, a U-shaped rear end retaining member having the free ends of its legs pivotally and slidably secured to the guide bars and means for holding said retaining member against sliding movement.

2. In a cow stall the combination with a stall body of longitudinal guide bars at the sides thereof, a U-shaped rear end retaining member having the free ends of its legs pivotally and slidably secured to the guide bars, a holding loop at a rear side portion of the stall and a projection on one arm of the retaining member engageable in the loop.

3. In a cow stall, a bed, a transverse trough, side frames including bars extending forwardly of the trough, a connecting member at the forward ends of the bars a grid plate pivotally suspended above said connecting member and a detachable chute member having its upper portion laterally directed to seat on said connecting member, with its lower portion extending into the trough.

4. A cow stall comprising front and rear stall posts, top rails connecting the posts and having their rear portions downwardly offset and a rear end retaining member including side portions slidably and pivotally mounted below said rails and adapted to swing to extend upwardly at the rear portions of the rails.

5. A cow stall comprising front and rear stall posts, top rails connecting the posts and having their rear portions downwardly offset, a rear end retaining member including side portions slidably and pivotally mounted below said rails and adapted to swing to extend upwardly at the rear portions of the rails, a grid member pivotally suspended at the forward ends of the top rails, and holding bars pivoted to the forward ends of the rear offset portions of the top rails and adjustably connected with the grid member.

6. In a cow stall, the combination with a stall body of a grid member hingedly suspended at the front thereof, holding bars intermediately pivoted at the sides of the body, loops at the lower side portions of the grid member slidably receiving the holding bars, lateral projections at the free ends of the bars, and intermediate portions of the bars being provided with loop receiving notches.

In testimony that I claim the foregoing I have hereunto set my hand at Edgerton, in the county of Rock and State of Wisconsin, in the presence of two witnessses.

HERBERT H. DREW.

Witnesses:
T. B. EARLE,
H. C. SCHMELING.

Copies of this patent may be obtained for five cents each, by addressing the "Commissioner of Patents, Washington, D. C."